United States Patent
Sullivan et al.

(10) Patent No.: US 7,464,094 B2
(45) Date of Patent: Dec. 9, 2008

(54) SHARED REGISTRY WITH MULTIPLE KEYS FOR STORING PREFERENCES AND OTHER APPLICATIONS ON A LOCAL AREA NETWORK

(75) Inventors: Gary E. Sullivan, Trabuco Canyon, CA (US); Kent M. Bowling, Foothill Ranch, CA (US)

(73) Assignee: Gateway Inc., Irvine, CA (US)

( * ) Notice: Subject to any disclaimer, the term of this patent is extended or adjusted under 35 U.S.C. 154(b) by 817 days.

(21) Appl. No.: 09/752,026

(22) Filed: Dec. 29, 2000

(65) Prior Publication Data

US 2002/0085579 A1    Jul. 4, 2002

(51) Int. Cl.
*G06F 17/30* (2006.01)
(52) U.S. Cl. .................................... 707/100
(58) Field of Classification Search ............... 707/1–3, 707/9–10, 100–104.1; 715/513
See application file for complete search history.

(56) References Cited

U.S. PATENT DOCUMENTS

| | | | | |
|---|---|---|---|---|
| 5,600,828 A * | 2/1997 | Johnson et al. | ............. | 707/1 |
| 5,832,511 A * | 11/1998 | Beck et al. | ............. | 707/201 |
| 5,949,419 A * | 9/1999 | Domine et al. | ............. | 345/744 |
| 6,119,133 A * | 9/2000 | Nusbickel et al. | ............. | 707/205 |
| 6,430,578 B1 * | 8/2002 | Vuong et al. | ............. | 707/203 |
| 6,493,751 B1 * | 12/2002 | Tate et al. | ............. | 709/221 |
| 6,581,075 B1 * | 6/2003 | Guturu et al. | ............. | 707/201 |
| 6,704,737 B1 * | 3/2004 | Nixon et al. | ............. | 707/101 |
| 6,738,766 B2 * | 5/2004 | Peng | ............. | 707/6 |
| 6,757,720 B1 * | 6/2004 | Weschler, Jr. | ............. | 709/220 |
| 6,789,086 B2 * | 9/2004 | Gray et al. | ............. | 707/103 R |
| 6,917,958 B1 * | 7/2005 | Howe et al. | ............. | 709/203 |
| 6,976,063 B1 * | 12/2005 | Dharmarajan et al. | ............. | 709/220 |
| 7,000,015 B2 * | 2/2006 | Moore et al. | ............. | 709/224 |
| 2001/0044812 A1 * | 11/2001 | Byrd et al. | | |
| 2002/0032694 A1 * | 3/2002 | Zawadzki et al. | | |
| 2002/0129013 A1 * | 9/2002 | Thomas | ............. | 707/3 |
| 2004/0030490 A1 * | 2/2004 | Hegedus et al. | ............. | 701/200 |

* cited by examiner

*Primary Examiner*—Debbie M Le
(74) *Attorney, Agent, or Firm*—Scott C. Richardson; The Brevetto Law Group, PLLC (57) ABSTRACT

A method and system for storing and automatic retrieval of data is provided. A "registry" is one way a computer system manages personal preference data such as configuration preferences and other data that users may want specific devices, applications and/or users to access. The present invention enables computer users to use a number of computer devices under essentially any circumstance and allows users and/or applications to provide individualized preference data for each situation. The registry is n-dimensional and data is stored using, for example, an identifier having three or more keys. Other features of the invention, such as wild cards and times tamps, result in a flexible robust registry system.

27 Claims, 10 Drawing Sheets

| USER | DEVICE | LOCATION | VALUE | DATA | TIMESTAMP |
|------|--------|----------|-------|------|-----------|
| * | * | * | HOMEPAGE | WWW.GATEWAY.COM | 00:00:00 |

| USER | DEVICE | LOCATION | VALUE | DATA | TIMESTAMP |
|------|--------|----------|-------|------|-----------|
| * | * | * | HOMEPAGE | WWW.GATEWAY.COM | 00:00:00 |
| FRED | WEBPAD | * | HOMEPAGE | WWW.CNN.COM | 07:00:00 |

| | USER | DEVICE | LOCATION | VALUE | DATA | TIMESTAMP | |
|---|------|--------|----------|-------|------|-----------|---|
| 420 | * | * | * | HOMEPAGE | WWW.GATEWAY.COM | 00:00:00 | 426 |
| 422 | FRED | WEBPAD | * | HOMEPAGE | WWW.CNN.COM | 07:00:00 | |
| 424 | * | PC | * | HOMEPAGE | WWW.MICROSOFT.COM | 08:00:00 | 428 |

| USER | DEVICE | LOCATION | VALUE | DATA | TIMESTAMP |
|---|---|---|---|---|---|
| * | * | * | HOMEPAGE | WWW.GATEWAY.COM | 00:00:00 |
| * | PC | * | HOMEPAGE | WWW.MICROSOFT.COM | 08:00:00 |

420 → (row 1), 426 → (timestamp row 1)
424 → (row 2), 428 → (timestamp row 2)

FIG. 4E

| USER | DEVICE | LOCATION | VALUE | DATA | TIMESTAMP |
|---|---|---|---|---|---|
| * | * | * | HOMEPAGE | WWW.GATEWAY.COM | 00:00:00 |
| FRED | WEBPAD | * | HOMEPAGE | WWW.CNN.COM | 07:00:00 |
| * | PC | * | HOMEPAGE | WWW.MICROSOFT.COM | 08:00:00 |
| BARNEY | * | * | HOMEPAGE | WWW.TOMSHARDWARE.COM | 17:10:00 |

FIG. 4F

| USER | DEVICE | LOCATION | VALUE | DATA | TIMESTAMP |
|---|---|---|---|---|---|
| * | * | * | HOMEPAGE | WWW.GATEWAY.COM | 00:00:00 |
| * | PC | * | HOMEPAGE | WWW.MICROSOFT.COM | 08:00:00 |

428 → (row 2)

FIG. 4G

| USER | DEVICE | LOCATION | VALUE | DATA | TIMESTAMP |
|---|---|---|---|---|---|
| * | * | * | HOMEPAGE | WWW.GATEWAY.COM | 00:00:00 |
| FRED | WEBPAD | * | HOMEPAGE | WWW.CNN.COM | 07:00:00 |
| * | PC | * | HOMEPAGE | WWW.MICROSOFT.COM | 08:00:00 |
| BARNEY | * | * | HOMEPAGE | WWW.TOMSHARDWARE.COM | 17:10:00 |
| FRED | * | * | HOMEPAGE | WWW.VOODOOEXTREME.COM | 18:10:00 |

440 → row 2; 442 → row 5; 444 → timestamp col

FIG. 4H

| USER | DEVICE | LOCATION | VALUE | DATA | TIMESTAMP |
|---|---|---|---|---|---|
| * | * | * | HOMEPAGE | WWW.GATEWAY.COM | 00:00:00 |
| * | PC | * | HOMEPAGE | WWW.MICROSOFT.COM | 08:00:00 |
| BARNEY | * | * | HOMEPAGE | WWW.TOMSHARDWARE.COM | 17:10:00 |
| FRED | * | * | HOMEPAGE | WWW.VOODOOEXTREME.COM | 18:10:00 |

446 → row 1; 448 → row 2; 442 → row 4

FIG. 4I

| USER | DEVICE | LOCATION | VALUE | DATA | TIMESTAMP |
|---|---|---|---|---|---|
| * | * | * | HOMEPAGE | WWW.GATEWAY.COM | 00:00:00 |
| * | PC | * | HOMEPAGE | WWW.MICROSOFT.COM | 08:00:00 |

SHARED REGISTRY WITH MULTIPLE KEYS FOR STORING PREFERENCES AND OTHER APPLICATIONS ON A LOCAL AREA NETWORK

BACKGROUND OF THE INVENTION

1. Field of the Invention

The present invention relates generally to computer systems and, more particularly, to systems and methods for storing and retrieving information.

2. Related Art

Computer users today are becoming increasingly sophisticated and demand systems that can provide automatic individualized preferences to any network device they use. On any given day, a computer user may use a number of electronic devices to access, for example, a local area network (LAN), a wide area network (WAN) or the Internet. These electronic devices may include, for example, personal computers (PCs) and Internet appliances such as Personal Digital Assistants (PDAs), cellular telephones, web pads, and the like. The user will typically prefer to have each of the devices he or she uses during the day configured in a particular orientation and/or have access to particular data depending on the device and its location, It would be desirable to have a system that automatically sets personal preferences and allows users to access relevant data when the user moves from device to device in accessing a network such as a LAN, a WAN, the Internet, and the like.

Currently available registry systems such as Microsoft Windows Registry provide computer users one method of setting personal preferences to devices such as PCs. The Windows Registry allows users to store personal preferences relating to applications and device configuration in a particular computer device, or on a network. For example, the Windows Registry allows users to store personal preferences for web-page browsers or device configurations, such as assigning a particular printer to be the default printer for a particular user on a particular device. If the same user goes to another device, unless the user manually sets preferences for each device, his/her preference settings will not be the same for each device. On the other hand, if the user uses a network registry, the user's preference settings will be the same on all machines even though the user may prefer that each device have a different set up. Thus, the Windows Registry provides users a limited means of storing personal configuration preferences that automatically activate when a user logs on to a particular computer or Internet appliance, or on a network.

The Microsoft Windows Registry may be viewed as being two-dimensional. The Windows Registry has a tree structure with a couple of different roots. As configured, the Windows Registry is only able to identify personal preferences based on a particular application and/or user. In other words, under Windows Registry, specific configurations or data can only be identified to a particular user or groups of users and/or a particular application or applications. This may be particularly limiting given the current advancement in computer technology and user behavior in which the user may prefer to have the same computer interface experience regardless of which device or location he is using.

Thus, it would be highly desirable to have a registry system which is three-dimensional or greater, providing more flexibility with automatic preference settings.

SUMMARY OF THE INVENTION

A robust, multiple key, data storage system is provided which automatically stores and retrieves data for specific situations. In one embodiment, the data storage system includes a "registry." A computer system utilizes the registry to manage personal preference data such as configuration preferences and other data that users may want specific devices, applications and/or users to access. The present invention enables computer users to use several computer devices and personalize, for example, the user interface of the device and/or application configurations (as well as other data) based on factors such as user identification, device identification, application identification, location identification, and the like.

One feature of the present invention is that it is n-dimensional. The registry allows users to select data such as interface configuration preferences not only unique to a particular user with a particular application, but also to set user preferences particular to the combination of three or more variables including, for example, user identification, application identification, device identification, location identification, and the like.

Another feature of the present invention is the use of wildcards as variables in the data identifier and timestamps for selecting one data entry from among a number of matches with a data query. Wildcards are floating variables that can take on any key value. Wildcards allow data entries to be associated with any input for a particular variable. Timestamps may act as a multiple match determiner to obtain a single data entry for a single registry inquiry. For example, when preference data is stored in the registry of the present invention, the registry also stores the time that the preference data was stored. This allows the registry to prioritize the various preference data stored in the registry for determining which data entry among a plurality of matches to a data query will be used as the user preference data. In one variation of the invention, the system may search for and eliminate data entries that have been superseded by more recent entries according to the timestamp.

In another embodiment of the present invention, the registry is linked to a local area network (LAN) or wide area network (WAN). Such networks are typically connected to one or more computer devices (e.g., PCs) and/or Internet appliances (e.g., webpads). The registry may be, for example, a database and may be able to identify a particular preference data associated with a particular combination of variables, for example, user, application, device, and/or location. In this embodiment, the registry automatically provides specific configuration and data preferences to any device and/or appliance that the user chooses to utilize on the network.

In yet another embodiment of the present invention, the registry provides configuration and data preferences to various devices located in a home network. Such a registry may be located in, for example, a central computer such as a PC, and be in communication with the devices included in the home network. When users move from device to device, carry a device from one location to another location, and/or change applications, the registry provides automatic configuration and/or data preferences that may be specific to those factors (e.g., who the user is, which device the user is utilizing, where the user is utilizing the device, and the like). In still another variation of the present invention, the registry may be incorporated into a network system which has an authority structure and/or a mirror imaging system such that configuration and data preferences may be located in both a central location as well as in remote locations.

Embodiments of the present invention provide a data storage system that is able to consider an unlimited number of variables when identifying the applicability of stored preference data. These multiple variables, combined with the wildcard and timestamp features, result in a flexible and robust data storage system well suited for a user preference registry.

DETAILED DESCRIPTION OF THE INVENTION

As the growth in computer use rises and the types of electronic devices that integrate with networks proliferate, the sophistication and needs of electronic device users have resulted in a demand for information and communication systems with greater flexibility. Today, computer users have a "ubiquitous" relationship with their computers. On a typical day, a user may utilize a number of computer devices. A hypothetical worker may work for a company headquartered in a large building. His office, which is located in the company building, will have a PC that he uses a number of times throughout a typical day. When he leaves his office to meet other co-workers in another part of the building, he may carry a cellular telephone with Internet access and/or a personal digital assistant (PDA) that he may want to use when he is out of his office. When he arrives at the meeting place, he may want to access the company's network at the PC located in that meeting room. Each time the worker wants to use one of these computer devices, he may have particular preferences as to how these devices are configured based on how they are used and where they are located. According to the present invention, these preferences may be initially set by the system and/or user and automatically provided by the system according to a plurality of parameters, for example, user ID, application ID, device ID, location ID, and the like.

For example, a user may want his PDA to have a different homepage depending upon whether he is attending a meeting with his co-workers in a conference room or he is in his office. If he is in the conference room, he may want a home page that is more relevant to his capacity as a company employee. However, while at his office, he may want a more general-purpose home page.

Further, the types of data that a user may want to access may differ depending on his location. For example, the user may want immediate access to personnel files when he is in the human resources department. However, in the accounting department, he might prefer immediate access to revenue or salary information. When the user moves to the production department, he may want access to files relating to production information. Thus, as the user's needs change, depending on where his location in his workplace, his default for immediate data access also changes.

In another example, a user may have several computer devices, such as PCs and Internet appliances, located throughout his or her household. During the course of a typical day, the user may move from room to room, accessing different devices throughout the household. The user's preferences for a user interface and types of data immediately accessible may vary, depending on the device and the location of the user and/or device. If, for example, the user's Internet appliance is located in the garage, the user may want that Internet appliance to have a home page with an automotive focus. When the user proceeds to the kitchen, the user may have access to a different Internet appliance in the kitchen and prefer a different home page on that Internet appliance. Also, if the user is carrying around a portable Internet appliance such as a PDA or a webpad, the user must manually adjust the appliance for personal preference each time the user moves to a different location in the household. In addition, there are typically multiple computer users in a household. Thus, it would be highly desirable to have a system which can provide personal preferences that are uniquely tailored to the user ID, device ID, application ID, location ID and any number of other parameters.

The "registry" of a computer system plays the lead role in setting up device and software configuration. For ease of understanding, the examples provided herein show the registry as having a database structure. However, it should be appreciated that the present invention does not require the shared multiple key registry to be configured in a database format.

In general, the present invention provides an n-dimensional shared key registry. One feature of the present invention is that the registry may accommodate an identifier with an unlimited number of keys to identify particular data in the registry. The keys are components of the identifier that identifies particular preference data. Specific preference data may be assigned to a particular identifier having a particular combination of keys.

The registry of the present invention may be, for example, a database that stores "preference data." Preference data may be any type of data but is typically device and/or application configuration information. In other words, the registry may be viewed as a central repository for preference data, e.g., configuration data. Each preference data typically relates to a particular type or types of data needed by one or more applications and are called herein "values." The relationship between the values and the preference data may be best explained by the following example. If the "value" is a default home page setting for an Internet browser, then the "preference data" for the home page value may be Gateway Computer's home page, "www.gateway.com." Thus, the "value" is a default home page, and one "preference data" for this default home page value is "www.gateway.com." An "identifier" having a particular combination of "keys" may identify each preference data. These parameters or "keys" are also known to those skilled in the art as "dimensions" and may include, for example, user ID, application ID, device ID, location ID, and the like.

The registry may include other features such as "timestamps" and "wildcards." The timestamp is a time record stored with preference data, indicating when the preference data was stored, or alternatively, a particular time selected by the system or the user. The timestamp enables the registry system to prioritize different preference data. The wildcard may be used in an identifier and is analogous to a joker in the card game "Poker", providing flexibility for the registry system to set default preferences. These features will be discussed in more detail below.

Figure 1:
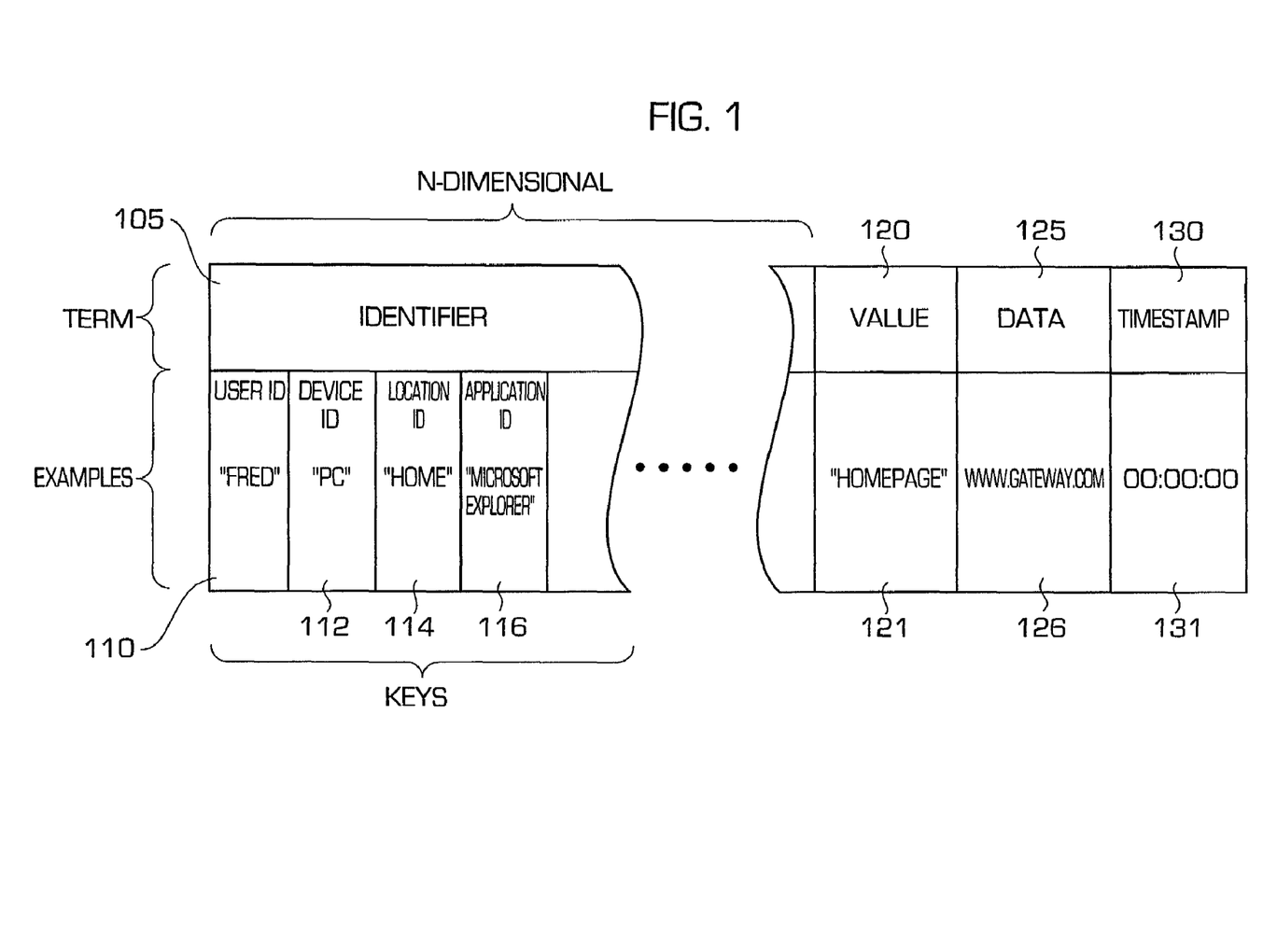
FIG. 1 is an illustration of the relationship between an identifier, keys, a value, preference data, and a timestamp in accordance with an embodiment of the present invention.

The relationship among the identifier, keys, value, preference data and timestamps may be better understood by referring to FIG. 1 illustrating this relationship. An "identifier" 105 is composed of keys 110, 112, 114 and 116. The identifier 105 may have an unlimited number of keys (e.g., n-dimensional). Each preference data 125 is associated with a particular identifier 105 (having a particular combination of keys 110, 112, 114, and 116), value 120, and timestamp 130.

Figure 2:
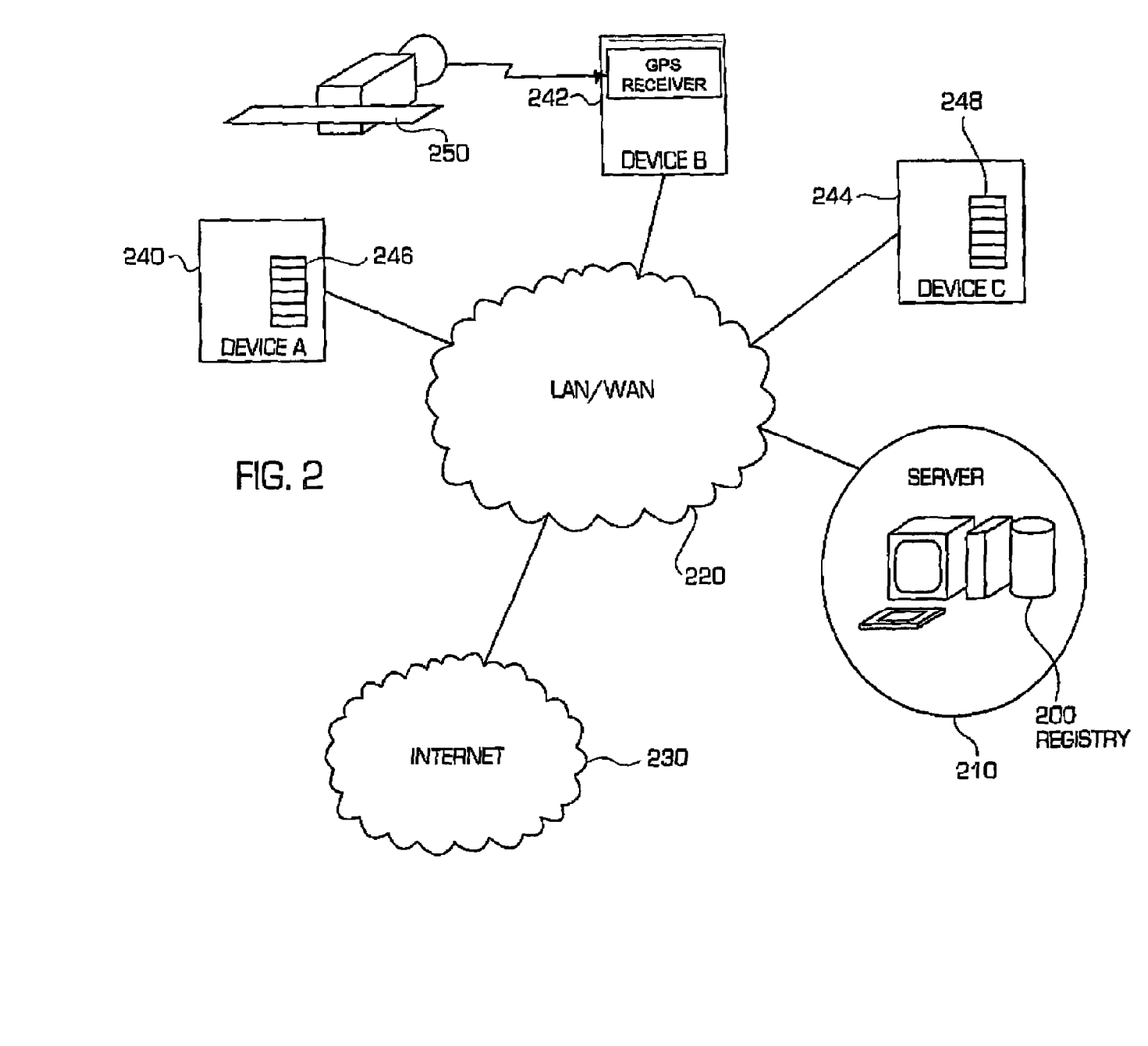
FIG. 2 illustrates a network system including a registry according to one embodiment of the present invention.

Referring to the example shown in FIG. 1, Fred turns on his PC at home and accesses his browser, Microsoft Internet Explorer. The Microsoft Internet Explorer goes to the registry 200 (as shown in FIG. 2) to obtain a default home page address. Based on the combination of keys in the n-key identifier, the registry 200 provides a default home page address, in this case, "www.gateway.com." In FIG. 1, user ID "Fred" 110, device ID "PC" 112, location ID "Home" 114 and application ID "Microsoft Explorer" 116 are the present combination of the component keys for the identifier 105. The value 120 sought by the Microsoft Internet Explorer in the registry 200 is "Homepage" 121. The registry 200, based on the identifier information, produces the data 125, "www.gateway.com" 126. Along with the stored data, the registry 200 may store a timestamp 130, in this case, a time value 131 of "00:00:00," indicating when the data was stored in the registry 200. To summarize, the keys 110, 112, 114, and 116 are the components of the identifier 105. The "value" 120 is what type of preference data the application seeks from the registry 200. The "data" 125 associated with this particular combination of identifier 105, value 120, and timestamp 130 is "www.gateway.com" 126.

When the system or the user queries the registry 200 for preference data having a particular combination of an identifier 105 and a value 120, the registry 200 may only produce one such data even though there may be several preference data 125 with identifier 105 and value 120 combinations matching the inquiry criteria (i.e., multiple matches). The timestamp 130 is one manner in which the registry 200 prioritizes multiple matches. For example, the registry 200 may select the preference data 125 with the latest timestamp 130. A more detailed discussion as to how the registry 200 produces only one preference data 125 for a particular combination of an identifier 105 and a value 120 even though several preference data 125 may satisfy the inquiry criteria will be discussed in greater detail below.

In another example, a user uses his/her PDA in the parking lot of his/her work office building. When the user turns on his/her PDA and accesses his/her web browser, the browser looks up the default home page in the registry 200 so as to display the preferred web site (e.g., the Gateway home page, "www.gateway.com"), which was previously set by the application or user for situations in which the user was located in his/her work parking lot. In this case, the present invention provides an n-dimensional registry 200 that recognizes, for example, the user ID of the user, the device ID of the user's PDA, the location ID of the user's location in the work parking lot, and the application ID of the Microsoft Internet Explorer or other web browser to determine the default home page for the web browser. The Gateway home page that the user sees on his PDA screen is the result of the web browser application accessing the registry to extract the preference data (e.g., "www.gateway.com") which corresponds to the n-dimensional identifier provided to the registry. Once the registry (the registry may be remotely located) receives the information relating to the identifier and value, the registry may provide the application with the preference data (e.g., "www.gateway.com") associated with the identifier and value. Thus, the present invention provides a means to assign specific configurations and data to specific identifiers (i.e., combinations of keys) and values. In other words, the present invention provides the means to retrieve specific configuration information and/or data and apply that configuration information and/or data to specific situations.

The registry may also include another feature called a "wildcard." The wildcard is analogous to a joker or wild card in the card game "Poker." It is used in the identifier and is a key that may take on any key value. For example, if a particular preference data has a wildcard for the user ID key, then that preference data may apply to any user. Similarly, if a wildcard is used for the device ID and/or location ID keys, the preference data may apply towards all devices and/or locations.

The registry may further include the use of "timestamps." The timestamp is a time record stored with the preference data, indicating when the preference data was stored, or alternatively, a particular time selected by the system or the user. The timestamp is one manner in which the registry system prioritizes different preference data. The timestamp becomes important when more than one record in the registry satisfies a set of particular registry inquiry criteria based on a particular identifier (i.e., combination of keys) and value. The system is configured so that it selects only one registry record per set of inquiry criteria by selecting the record and its preference data having the highest timestamp.

The importance of the timestamp may be best illustrated by the following example. When an inquiry is made to the registry seeking a record that matches a particular identifier (i.e., combination of keys) and value, the registry searches for all records that match the inquiry criteria (i.e., the specific combination of keys, wildcards, and/or value). Often, there may be two or more records that satisfy such an inquiry. For example, a record corresponding to a system or application default setting, and a record corresponding to a user setting or personal preference entered by a particular user, may both satisfy the inquiry criteria. Although the identifier for both the default setting and the user setting may satisfy the inquiry criteria, they will likely have different time stamps. This will result in the registry system preferring to select one setting over the other setting. For example, the default setting may have a timestamp of zero, while the user setting may have a timestamp greater than zero. The registry will pick the record (and its preference data) corresponding to the user setting because it has the greater timestamp value. Thus, the timestamp provides a method for prioritizing registry records having an identifier and value combination that match the registry inquiry.

Another way of using timestamps is for the user to set a timestamp at a high or infinite value. By doing so, the user may create preference data that cannot be "defeated" or overwritten by subsequently stored data having an identifier and value combination that will match the same query. Thus, timestamps provide a way of creating a hierarchy for preference data.

Figure 5:
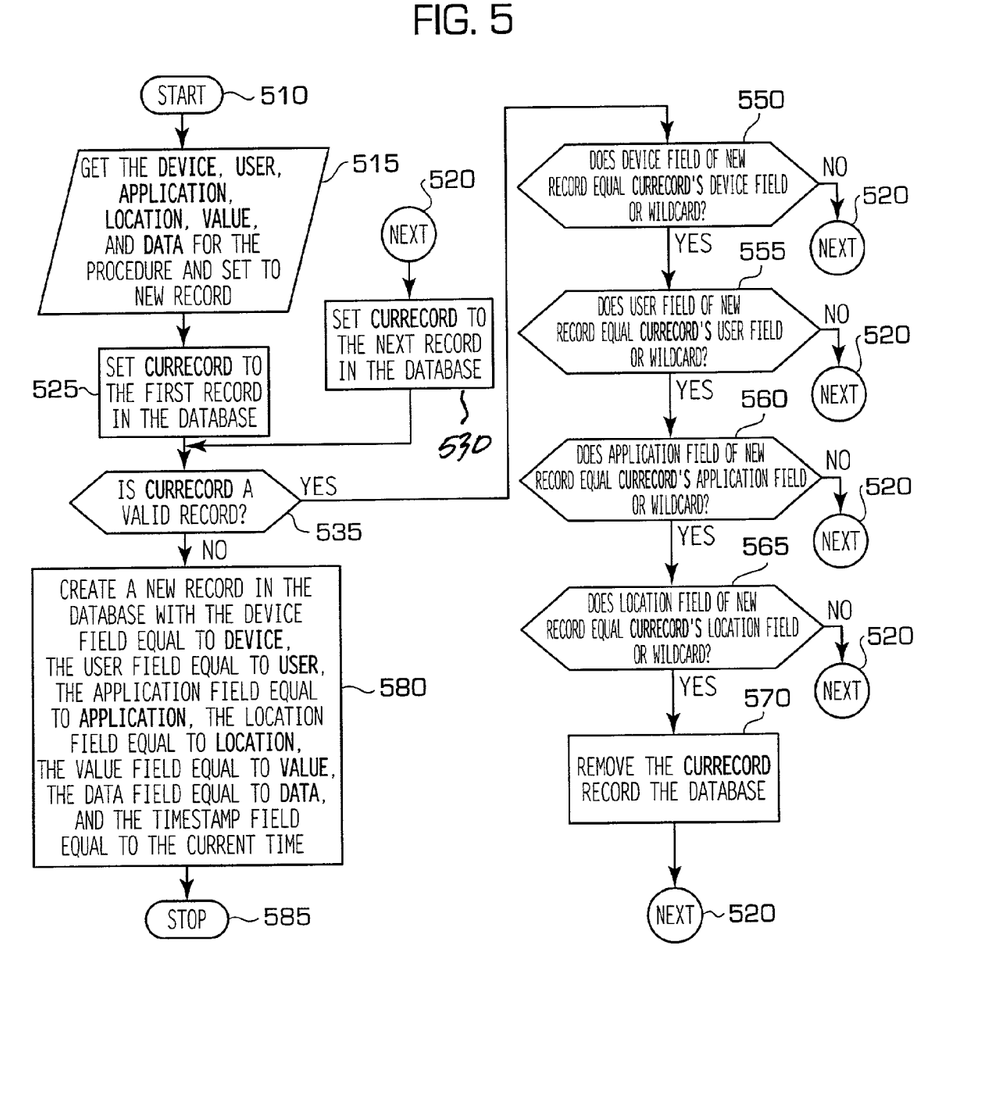
FIG. 5 is a flow chart illustrating a method for storing preference data together with an identifier and a value associated with preference data, and a method for deleting superseded data records, according to one embodiment of the present invention.

In preferred embodiments of the present invention, memory space in the registry may be more efficiently utilized in several manners. For example, the registry may use wildcards and be stored as a sparse array structure. By using wildcards, default settings may be efficiently set for users not listed in the registry or for users listed in the registry but having no preferences. As another example, superseded preference data may be deleted, thus freeing up memory space. A method for deleting one preference data if it has been superseded by another preference data having a later timestamp is illustrated in FIG. 5 and will be discussed below.

FIG. 2 shows a network system including a registry in accordance with a preferred embodiment of the present invention. The system includes a central repository 210 linked to a LAN or WAN 220. The shared multiple key registry 200 preferably resides in the central repository 210. The central repository 210 may be, for example, a server capable of providing database services often used for such purposes. In one variation, the central repository 210 may be a central home computer, such as a PC, and the LAN/WAN 220 may be an in-house network. In any case, the LAN/WAN network 220 is coupled to the Internet 230. The system also includes devices 240, 242 and 244, which are a plurality of devices, such as Internet appliances (including but not limited to, web pads, PDAs, cellular telephones, refrigerators, ovens, coffee makers, and the like), and/or computer devices, such as PCs. In the illustrated embodiment, Device A 240 and Device C 244 include computer applications 246 and 248. However, Device B 242 does not have applications included in its configuration because some Internet appliances may not have the ability to store such applications. Nonetheless, even if Device B 242 does not have applications, it has an operating system that may use the registry 200 to store and access personal preferences for its operation. The system further includes a GPS satellite 250, which may provide information to the system about the location of the user and/or device. In alternative embodiments, other location determining devices may provide such location information, such as room specific transceiver devices including location capability.

Figure 3:
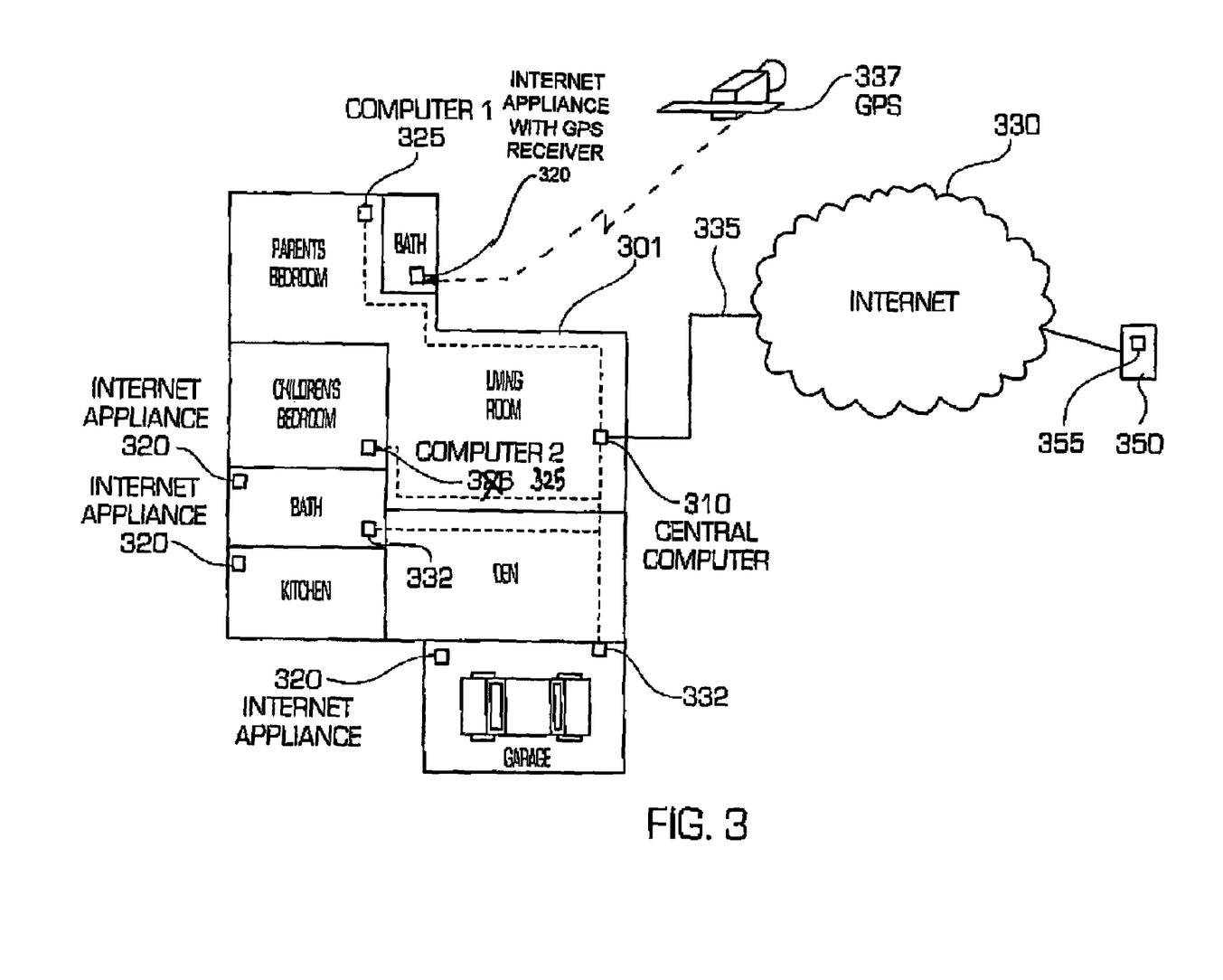
FIG. 3 is an illustration of a home network including a central registry according to one embodiment of the present invention.

FIG. 3 illustrates one embodiment of the present invention in which the network is a home network. In a residence 301, a central or master computer 310 is connected to the Internet 330 by a link 335. The central computer 310 may be, for example, a server, PC, Macintosh, and the like. The central computer 310 is also directly or remotely in communication with Internet appliances 320 and other computer devices 325. Each Internet appliance 320 and/or computer device 325 preferably has applications stored in its memory for operating various functions on the device. The computer devices 325 may be connected to the link 335 either directly, or otherwise, indirectly through the central computer 310. A GPS satellite 337 provides location information about the location of a user and/or a device. Of course, other devices, such as transceiver 332, may be used instead of the GPS satellite 337 for determining the location of the user and/or the devices using methods well known in the art. For example, there may be a number of transceivers 332 located in different rooms throughout the residence 301. These transceivers 332 may be in communication with the computer devices 320 and the central computer 310, and may provide a means of tracking the location of the user and/or the devices based on relative signal strength.

FIG. 3 illustrates that the registry 200 may be provided with many different combinations of keys (e.g., user ID, application ID, device ID, location ID, and the like) related to a particular user or users utilizing different devices in a LAN, such as a LAN in the residence 301, and at different locations throughout the residence 301. The present invention provides a means for automatically downloading data, for example, personal configuration settings and/or other data preferences to any of the network devices that a user may access, regardless of location. The preference data may be stored in the registry 200, which may be located in, for example, the master computer 310. However, a primary registry 355 may also be located on a remote server 350 linked to the Internet. If a remote primary server is used, some or all the devices on the network may also store a mirror image of the user's preference data in a local registry 200 for cases where the Internet is not available. Further, each device may independently store preferences in case the device is disconnected from one or more registries. In such a system, the devices, which have a local registry 200 with the capability of retaining mirror images of user preferences, may exchange information relating to changes in the user preferences with the registry 355 on the remote server 350 or the registry 200 within the central computer 310 on a regular basis. If the remote registry 355 is used, a system which allows synchronization would likely be employed. For example, if a non-connected device makes changes to the local registry 200, the device may then synchronize with the remote registry 355 once it is reconnected to the remote registry 355.

In any case, the preference data stored in the registry (200 and/or 355) includes device and data preferences for a specific combination of user ID, device ID, location ID and/or application ID keys. During the course of a typical day, a user may access a number of Internet appliances 320 and/or computer devices 325 in the user's home 301. For example, the user may access the computer device 325, Computer 1, in the parents' bedroom when the user wakes up in the morning. The registry (e.g., 200 or 355) automatically provides configuration or preference data to the computer device 325 according to the application ID, device ID (computer device 325), user ID, and/or location ID. For example, when the user activates a browser and logs on to the Internet using the computer device 325, the registry (200 or 355) provides data to automatically configure the computer device 325 to the user's personal preferences based on the user ID, device ID, application ID and/or location ID (e.g., the user may prefer his/her home page to be "www.gateway.com" while the user is in the parents' bedroom).

While still in the parents' bedroom, the user may also decide to pick up a mobile Internet appliance, such as a PDA. The PDA may also have as its home page in the parents' bedroom the same home page as the computer device 325, Computer 1, based almost on the same key combination (e.g., user ID equal to "user," location equal to "parents' bedroom," and the device ID equal to "PDA" instead of "PC"). On the other hand, the user may prefer a different home page for the different devices, or a different home page regardless of which device the user is utilizing depending instead on the user's location. Thus, the user may set his preferences such that once the user leaves the parents' bedroom and carries his PDA into other rooms in the house 301, the personal preferences (e.g., default home page) for the PDA may change because the location ID key will change.

For example, if the user moves from the parents' bedroom to the garage, the user's home page for the PDA may change from "www.gateway.com" to something more appropriate for the garage, such as the web page for the American Automobile Association, "www.AAA.com." Later, the user may move into the kitchen still carrying his/her PDA, and the home page on the PDA may change again, for example, to something more oriented towards cooking such as Julia Child's homepage, "www.juliachilds.com." Thus, the user's Internet browser home page for the PDA may differ based on changes to the location ID key depending on the user's preferences stored in the registry (e.g., 200 or 355).

The user's spouse may also have his or her own personal preferences for each application, device and/or location in the house 301. For example, after the user finishes utilizing the computer device 325, Computer 1, in the parents' bedroom, the spouse may access the same computer device 325, Computer 1, and log on to the Internet using the same browser. Based on the key information (e.g., user ID, application ID, device ID, location, and the like) provided to the registry 200, the spouse's home page may be different from the user's home page. The spouse's home page in the parents' bedroom may be "www.netscape.com." When the spouse moves to the living room and uses the master computer 310 to access the Internet, the spouse may see a different home page on the master computer 310 based on the information provided to the registry (e.g., 200 or 355) (e.g., user ID=spouse, application ID =Netscape Navigator, device=master computer and location=Living Room).

Another more detailed exemplary embodiment will now be used to explain how the registry of the present invention stores and retrieve data with reference to FIGS. 4A to 4I. For purposes of understanding, this discussion will utilize a three-dimensional (three-key) registry. The three dimensions (keys) considered will be "user," "device" and "location." The "value" (i.e., the information type) that will be set and sought in this example again is "home page" for a web browser (e.g., Microsoft Explorer). However, it is understood that another value, such as the design of the "background" of the desktop screen, or any other value may have been used. It is also understood that the values in this system may be treated (and actually are in this embodiment) as simply another dimension or key. The only difference between the values and any other keys is that wildcards are not typically used for the values. This is because typically it does not make sense for an application to ask for a non-qualified or specific type of value. A wildcard in this case would not return any useful information. In any case, in the present example, both wildcards and timestamps will be included to provide an exemplary illustration of the roles that these features may play in the invention. The timestamps posted in this example are provided in human readable times, and for the purposes of this example, have been made for the same date.

For convenience in this example, the registry will be included as part of a system referred to herein as the personal storage area (herein "PSA"). In general, the PSA is an application programming interface (API), i.e., a software service that applications use to request and carry out lower-level services performed by an operating system. In the following example, two "function calls" are used to interact with the PSA system—one will set the values (SetData) and one will get the values (GetData). The actual system may have more functions (such as enumeration type functions), but they are not needed to understand the storage scheme of the registry and the PSA. In this example, the SetData function accepts five parameters—user, device, location, value, and data. The GetData function takes four parameters—user, device, location and value. GetData retrieves the data related to or identified by these dimensions and provides it to the application needing the information. Assuming that each parameter has its own data type, the prototypes of these two functions look like this:

SetData (User user, Device device, Location location, Value value, Data data)

Data GetData (User user, Device device, Location location, Key key)

Referring to FIGS. 4A-4I, this example illustrates a series of steps, showing records in the registry and the state of the PSA system when a particular set of data is stored or sought.

A "record" is a related set of variables that may comprise keys, a value, preference data, a timestamp, and the like. For example, in FIG. 1, the row which includes Fred, PC, Home, homepage, www.gateway.com, and 00:00:00 makes up a record. Since the PSA is an API for other applications to use, these steps show only one way of how the system may function. The example has two users "Fred" and "Barney," and two devices called "webpad" and "pc", which represent a web pad device and a PC.

Typically when the present invention is implemented, it would be preferred to have default settings for the various applications. That is, in Step 1 of the following example, we set a default value for every user on every device, in every location. These default settings may be initially entered into the registry when an application, such as the web browser Microsoft Internet Explorer, is installed on the system or device. Alternatively, these default settings may be set with a registry-specific user interface. Further, the particular users "Fred" and "Barney" and/or devices "webpad" and "pc" may not initially exist in the registry. Various steps in the operation of storing and getting preference data from the registry will now be explained.

Step 1: Let's say that Gateway is shipping a software system, and they want the default home page of every user to be "www.gateway.com" on every device at every location. This setting may be accomplished by the following call:

SetData ( "*", "*", "*", "homepage", "www.gateway.com")

Figure 4A:
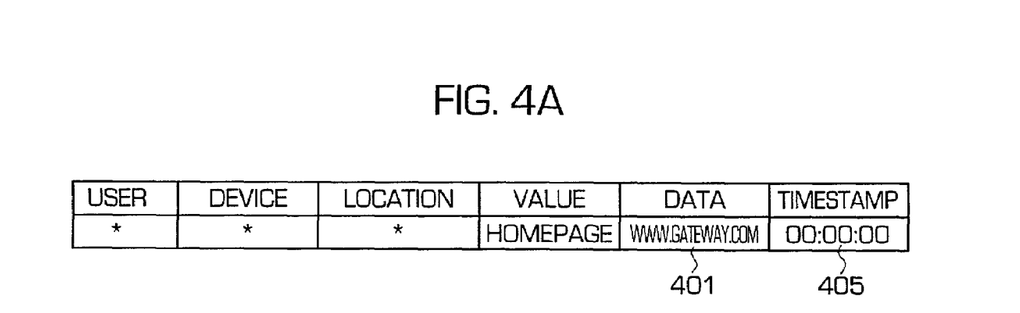
FIGS. 4A through 4I are block diagrams illustrating how the registry operates to store and retrieve preference data according to one embodiment of the present invention.

The above call will set the data field for the four corresponding dimensions or keys (e.g., user ID =*, Device ID=*, Location ID=*, Value=homepage) to "www.gateway.com." The "*" symbol indicates a wildcard which may take on any value as discussed above. FIG. 4A illustrates how the registry in the PSA system would look after this call. Thus, after step 1, regardless of which user is using which device in which location, the home page will be "www.gateway.com." As mentioned earlier, this step sets the default setting for everybody. Note that the value of the timestamp is 00:00:00 (see 405) representing an initial time.

Step 2: Let's say that a user named "Fred" picks up a web pad which uses this system and begins to use it in the bedroom of his home. The user is identified by the system as "Fred" using, for example, a user ID entered by the user, a thumbprint scan of the user's thumb, and the like. The system retrieves preference data for "Fred's" home page. It calls:

GetData ("Fred", "webpad", "bedroom", "homepage")

Figure 4B:
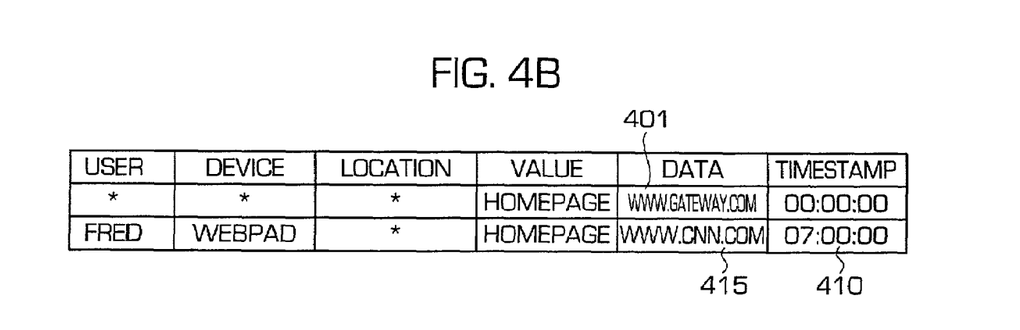

The system then looks for all entries where the user is "Fred" or wildcard, the device is "webpad" or wildcard, the location is "bedroom" or wildcard, and the value is "homepage". Referring to FIG. 4B, that call returns the only entry currently in the registry, which is "www.gateway.com" (see 401). Thus, the web browser on the web pad uses "www.gateway.com" as Fred's initial home page when he activates the web browser.

Step 3: At 7:00 AM, Fred decides that he wants "www.cnn.com" as his home page, but only on his web pad, since he traditionally uses his web pad to read the news in the morning. The system call for setting this page as his default home page is:

SetData ("Fred", "webpad", "*", "homepage", "www.cnn.com")

FIG. 4B illustrates how the registry will look after this call. Note that the timestamp 410 for Fred's entry is listed as 07:00:00 (see 410). This means that Fred's data entry, www.cnn.com (see 415), will supersede the default data, "www.gateway.com" (see 401), anytime Fred subsequently accesses his web browser.

Step 4: At 8:00 AM, someone (possibly an administrator or any user having authority to set default settings) decides that the home page on any PC should be "www.microsoft.com". The system call is:

SetData ( "*", "pc", "*", "homepage", "www.microsoft.com")

Figure 4C:
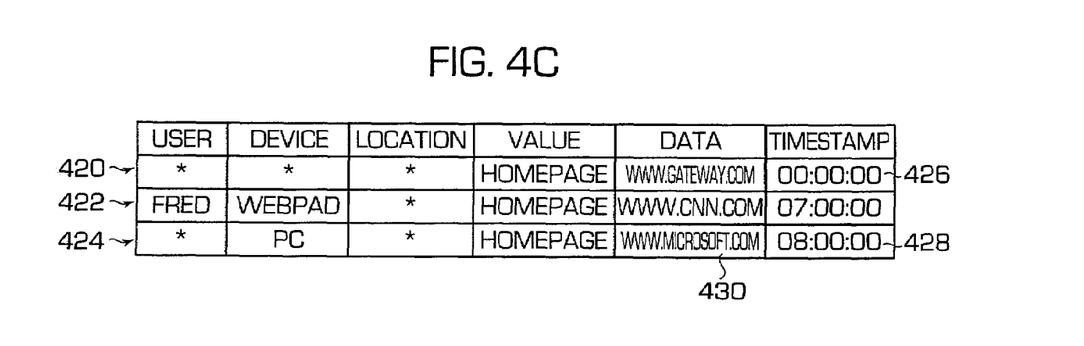

FIG. 4C illustrates how the registry will look like after this call.

Step 5: At 5:00 PM (17:00 military time), Barney uses the PC in Fred's living room to access the Internet by activating, for example, a web browser. The system reads the registry to determine Barney's preferred home page. It calls:

GetData ("Barney", "pc", "*", "homepage")

Figure 4D:
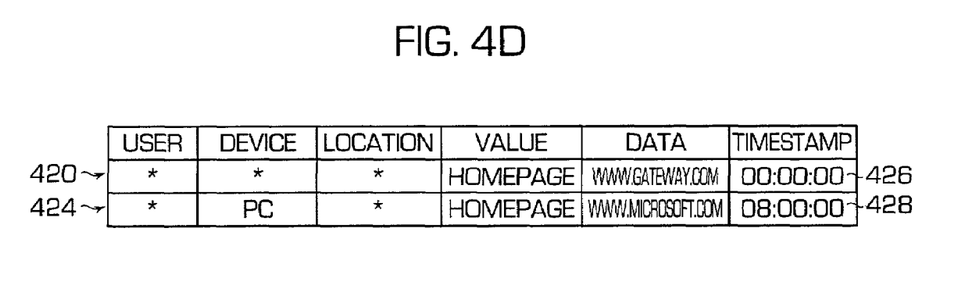

This call results in a search for all entries where the user is "Barney" or wildcard, the device is a "pc" or a wildcard, the location is "living room" or wildcard, and the value is "homepage." This search returns two records as illustrated in FIG. 4D. The two records that qualify under the search criteria are the record 420 in the first row, and the record 424 in the third row, of the table in FIG. 4C. The second row 422 in FIG. 4C does not qualify because it has in its user key, "Fred," and in its device key, "webpad." The system may then look at the timestamps of all the entries, and the newest record wins. In this case, the system looks at the timestamp 426 and compares it with timestamp 428, and the 08:00:00 timestamp 428 wins. Thus, the "www.microsoft.com" data entry 430 is used as the default home page for the web browser activated by Barney when using a PC.

Step 6: At 5:10 PM, Barney decides he wants to use "www.tomshardware.com" as his home page no matter what device he is currently using. The system calls:

SetData ("Barney", "*", "*", "homepage", "www.tomshardware.com")

Figure 4E:
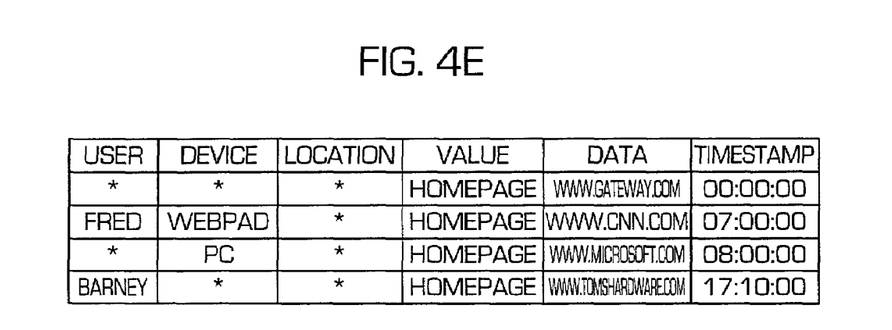

FIG. 4E illustrates how the registry of the PSA system would look after the above call.

Step 7: At 6:00 PM (18:00), Fred logs onto the PC in his living room. The system reads the registry to determine his home page:

GetData ("Fred", "pc", "living room", "homepage")

Figure 4F:
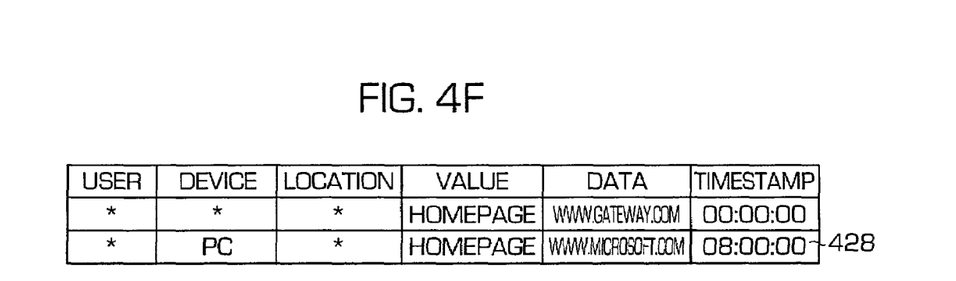

This call performs a search for all entries where the user is "Fred" or wildcard, the device is "pc" or wildcard, the location is "living room" or wildcard, and the value is "homepage". This search returns two entries as illustrated in the table of FIG. 4F. In this case, the "www.microsoft.com" data is used as the default home page for Fred when using a PC at any location because it has the latest timestamp 428.

Figure 7A:
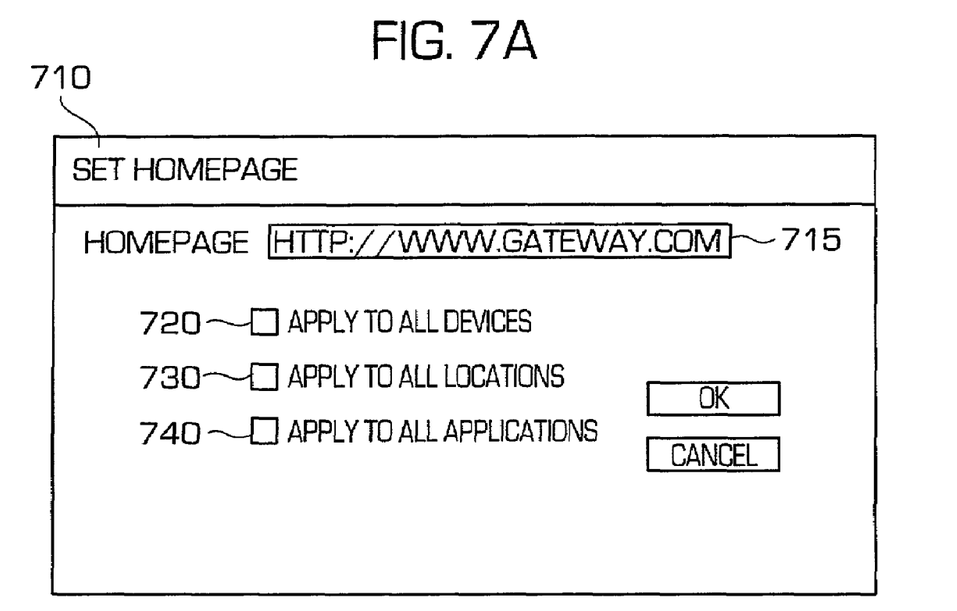
FIGS. 7A and 7B illustrate exemplary user interfaces for setting user preferences to particular variable combinations, according to various embodiments of the present invention.
Figure 7B:
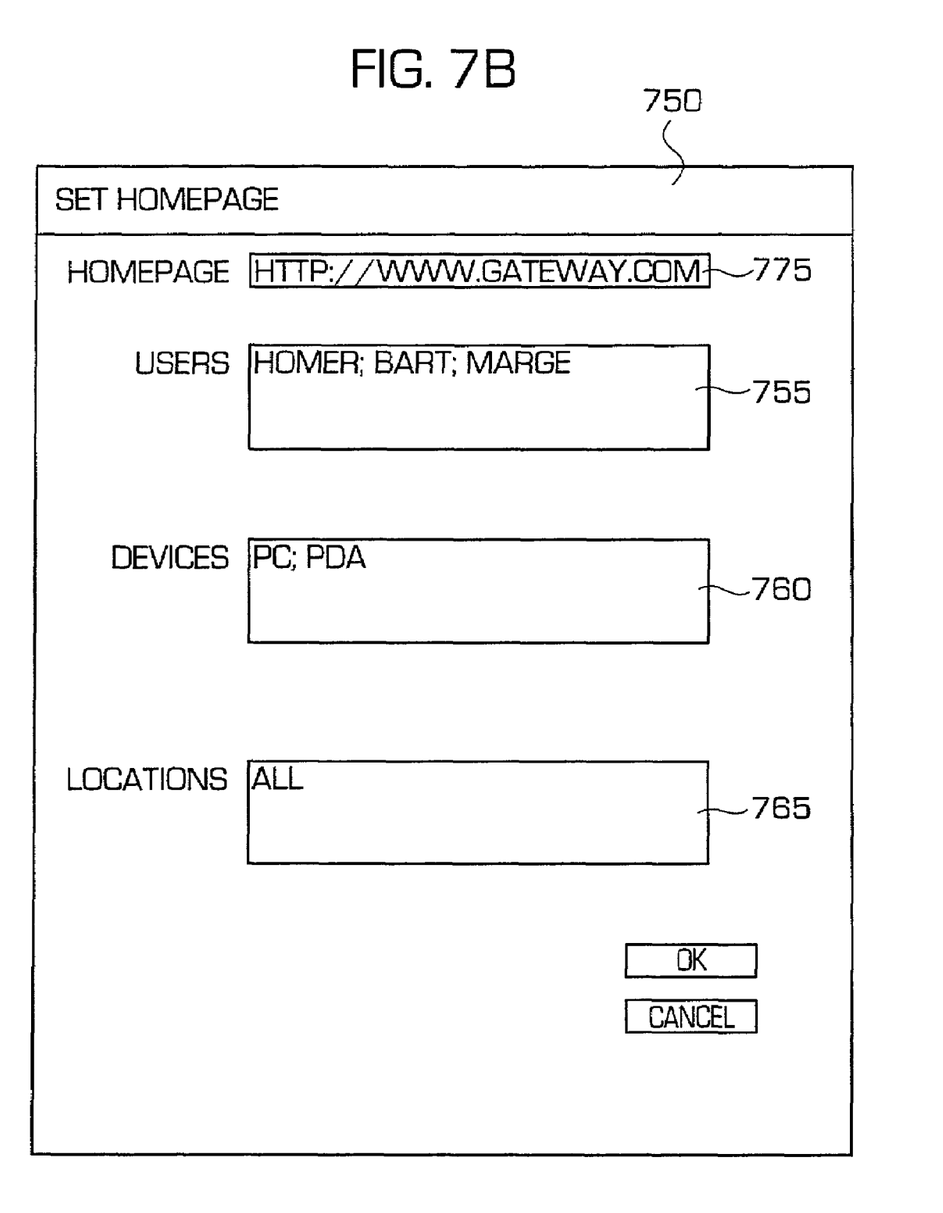

Step 8: At 6:10 PM (18:10), Fred decides that he wants "www.voodooextreme.com" to be his home page on all devices. Fred inputs the necessary information and the system makes the call (see the user interface as illustrated in FIGS. 7A and 7B):

SetData ("Fred", "*", "*", "homepage", "www.voodooextreme.com")

Figure 4G:
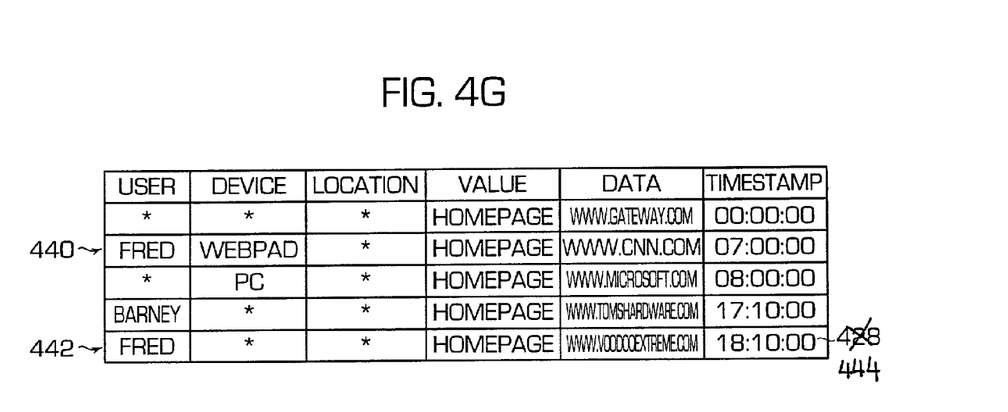

FIG. 4G illustrates how the registry in the PSA system would look after this call.

Figure 4H:
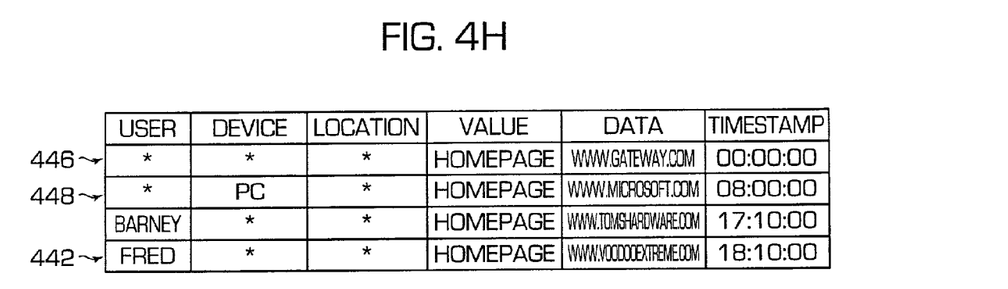

It is now important to note an optimization that the PSA may use. The second record 440 will never be found again, as the timestamp 444 for the newest record 442 will always cause its entry to be found. In one variation of the invention, the PSA system may thus remove the second record 440 from the registry. FIG. 4H illustrates how the registry of the PSA looks like after the PSA internally removes that record 440.

Although it might seem as though additional entries might be removed as a result of the creation of the record 442 (e.g., the first two fields in the first row 446 and second row 448), it is important to note that, while some entries are currently not used for any users or devices, they are still defaults for new users, if such new users or devices are added, as shown by Step 9. The method for deleting old preference data will be illustrated in a flow chart (see FIG. 5) and discussed in more detail below.

Step 9: A new user named "Betty" logs on to the PC. The system retrieves the preference data for her home page.

GetData ("Betty", "pc", "*", "homepage")

Figure 4I:
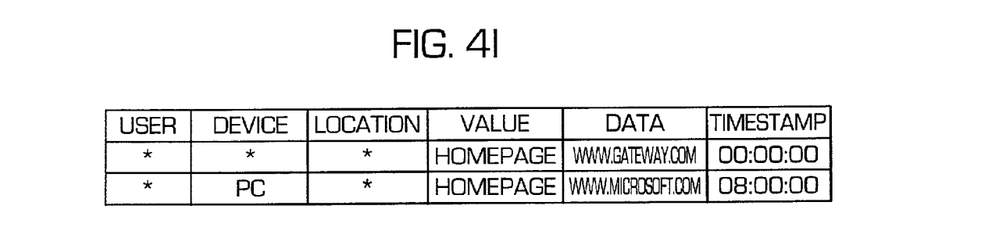

A search is done of the registry entries as illustrated in FIG. 4H and returns the two entries as illustrated in FIG. 4I. If these default records had been erased, the GetData call for Betty on a PC would not have returned any data and the web browser would have failed to display a home page. When resolving the conflict between the two valid records, the PSA uses "www.microsoft.com" as Betty's home page due to its later timestamp. If Betty had asked for a home page using a web pad, the original "www.gateway.com" would have been used. It should be noted that an entry for Betty is not actually in the registry. Entries for Betty are only added when she begins to customize by, for example, selecting her own preferred home page. This allows the freeform usage of new users, devices, locations, or any other keys which are utilized.

Referring to FIG. 5, the flow chart illustrates a method for storing new preference data, as well as deleting old preference data superseded by the new preference data, together with the identifier (a set of keys such as user ID, device ID, and the like) and the value (e.g., homepage) associated with the preference data in a shared multiple key registry. The present invention provides for an n-dimensional (i.e., unlimited dimensional) registry that may store various types of preference data, such as device and application configurations. Specifically, the flow diagram illustrated in FIG. 5 applies to a four-dimensional or four-key registry. In this illustration, the four key fields are device ID, user ID, application ID, and location ID.

The flowchart in FIG. 5 does not illustrate the situation in which preference data stored in the registry 200 may immediately become a candidate for deletion. This situation may occur, for example, if the user is allowed to alter the timestamp when storing the preference data in the registry 200. A system administrator may store data in the registry 200 with a "maximum timestamp" so that the data may never be overwritten. Thus, any data subsequently stored in the registry with the same identifier and value may never be found because its timestamp is less than the maximum timestamp. It should be appreciated that, while the method illustrated in FIG. 5 does not handle this situation, the method may be easily modified by one skilled in the art to handle this situation.

Referring to FIG. 5, the registry obtains the identifier (user ID, application ID, device ID and location), the value, and the preference data to be stored, and then stores these fields into a new record (same format as the SetData function call described above) at step 515. The registry system then checks to see if there are any current records that may be removed because the new record has superseded them. Next, if there are records presently in the registry, the system copies the first record in the registry (i.e., the entry in the registry containing already stored preference data and its associated value and identifier information) to a field called curRecord at step 525. At step 535, the registry system determines whether the record in the curRecord is valid. This step is done for determining whether the registry system has run through the entire database and is at the end of the database. If the record in the curRecord is invalid, then the registry recognizes that it has reached the end of the database and proceeds to store the new preference data with its associated value and identifier information (i.e., the data obtained in step 515) at step 580.

If the record in the curRecord is valid, then the PSA system checks to see if the identifier field for the curRecord matches the identifier field of the new record obtained in step 515. This check is accomplished by comparing each key field of the curRecord identifier to each key field of the new record identifier in steps 550 to 565. If each key field of the curRecord identifier matches or is a wildcard for each key field of the new record identifier, then the record corresponding to the curRecord will be deleted from the database at step 570. If any of the key fields do not match, then this method continues record-by-record through the registry database at steps 520 and 530 and then 535 through 570 until all current records in the database have been checked for being superseded by the new record. Upon loading another record into the curRecord, the PSA system goes back to the beginning of the entire method described above by first checking to see if the record in the curRecord is valid or invalid at step 535. Of course, the step of actually recording the new data, as obtained by step 515, will not be completed at step 580 until all the old records having the same identifier as the new record are deleted. Although the process for deleting superseded records is shown as including five steps, one skilled in the art would understand that it may be achieved with a single step comparing all the key fields of the identifier at one time.

At step 580, the PSA system creates a new record in the database by copying the information obtained in step 515 into the database and setting the timestamp to, for example, the current time. In summary, the flow chart of FIG. 5 shows a PSA system that first, in steps 520 to 570 runs through the registry records and deletes all the old records that are superseded by the new record being added to the registry, before the new record is stored. These steps are not needed, but may be used to assist the system in saving memory space.

Figure 6:
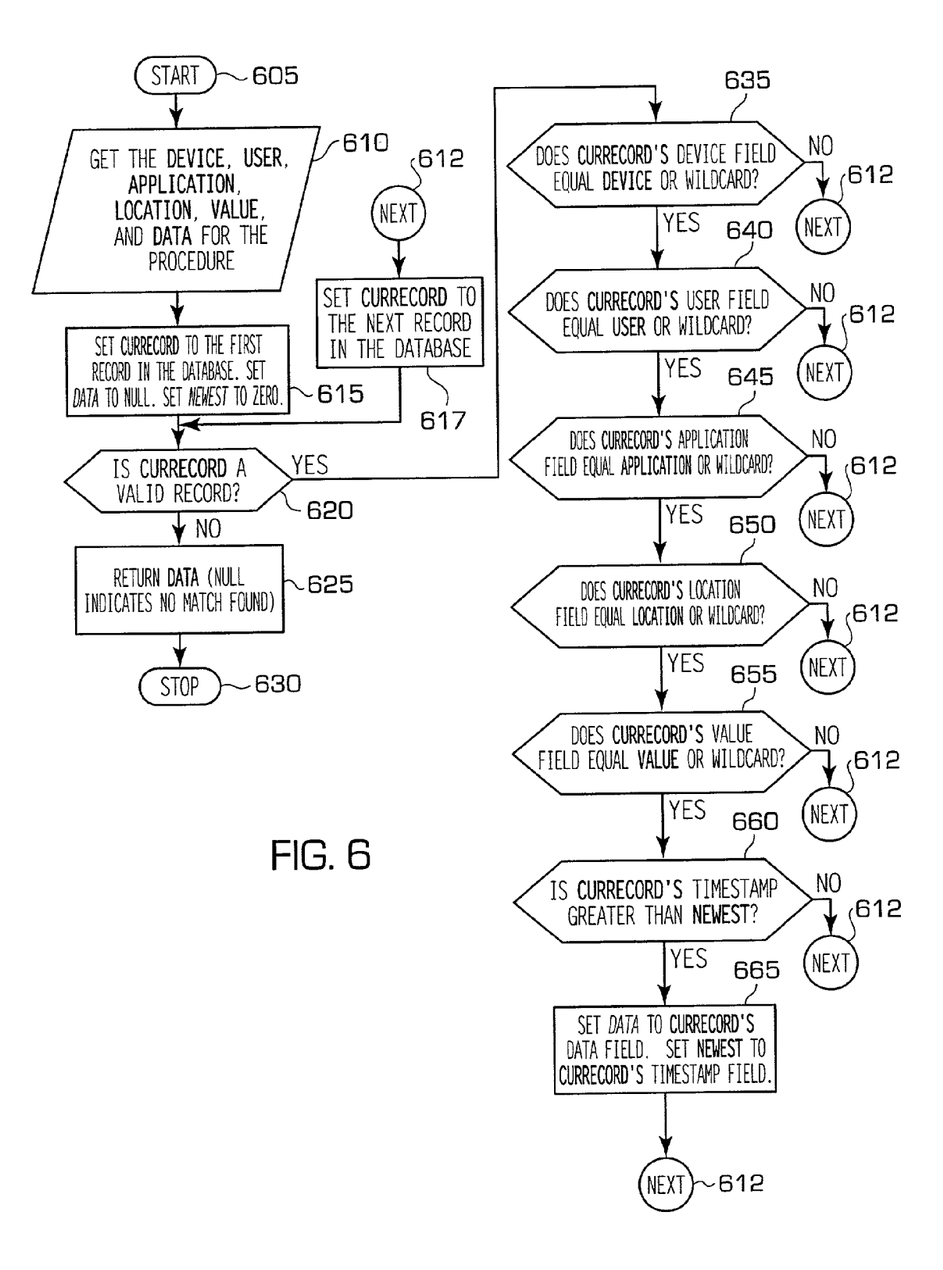
FIG. 6 is a flow chart illustrating a method for retrieving preference data for a particular identifier and value from a registry, according to one embodiment of the present invention.

Referring to FIG. 6, the flow chart illustrates a method for retrieving preference data corresponding to a particular identifier and value from the registry. Again, although the present invention provides for an n-dimensional (i.e., unlimited dimensional) registry, the flow chart in FIG. 6 shows a method for a four-dimensional or four-key registry. In this example, the four key fields are device ID, user ID, application ID, and location ID.

At step 610, the PSA system receives the identifier and value information provided by a computer device, such as for example, an Internet appliance or PC. Next at step 615, the PSA system retrieves a first record in the registry (i.e., the first record in the registry that contains previously stored preference data and its associated value and identifier information) and copies it to a record called curRecord. Further, the PSA system sets a variable called data to null and a variable called newest equal to zero. Next at decision step 620, the PSA system checks to see if the process has finished looking through all the entries in the registry. If the curRecord field is valid at step 620 (indicating that the PSA system has not reached the end of the database), then the system moves to step 635.

Steps 635 to 655 compare the identifier (e.g., the four device ID, user ID, application ID and location ID keys) and the value fields obtained in step 610 to the corresponding fields in the curRecord record that is downloaded in step 615 or 617. If the key fields and value field obtained in step 610 match the key fields and value field of the curRecord through decision steps 635 to 655, then the system checks to see if the timestamp in the curRecord record is greater than the timestamp stored in the variable newest at step 660. If the timestamp in the curRecord record is greater than the timestamp in newest, then the system replaces the old record in the data variable with the record in the curRecord, and sets the variable newest to curRecord's timestamp field at step 665. Upon completion of step 665, the system loads the curRecord record with the next record in the registry database, and the entire process of checking the validity of the record and comparing the identifier and value information obtained in step 610 to the identifier and value fields in the curRecord is executed again. Similarly as discussed above with respect to FIG. 5, these steps illustrated in FIG. 6 may be consolidated into a single step query to the registry.

Eventually, the PSA system will reach the end of the database, which the system will know by finding an invalid curRecord record at step 620. If an invalid curRecord record is found, the system has completed its review of the entire registry database and provides a return equivalent to the record in the data variable. If there is a null value in the data variable, no match for the identifier and value obtained in step 610 was found, and the system provides a return which indicates this condition. Therefore, the PSA system preferably finds a single record in the registry which matches the identifier and value fields provided in step 610 and is the most recent entry in the registry, and returns from this record the data needed to set, for example, the user's preferences.

FIG. 7A shows an example of a user interface 710 for setting a home page preference 715. Although the interface illustrated in this and other previous examples is for setting up a home page preference, it should be understood that the invention and this example may be applicable to other types of application preferences (such as, for example, desktop, word processing, spreadsheets, personal organizer, and the like). In this illustration, the preferred home page (e.g.,"www.gateway.com") is inserted into the home page preference data field 715. By selecting the "Apply to All Devices" box 720 using a mouse or any other means typically used to perform such tasks, the user may set the user's home page to "www.gateway.com" for all devices in the network. Similarly, by selecting the "Apply to All Locations" box 730, the user may set the user's home page to "www.gateway.com" for all locations. Further, by selecting the "Apply to All Applications" box 740, the user may set the user's preferences to be used for all applications. For example, if there is a particular background color that a user wants all applications to utilize, the user may select "Apply to All Applications" for setting that data preference. In the present invention, the "Apply to All" choices may be stored utilizing a wildcard or wildcards.

FIG. 7B shows another user interface 750 which may be provided for a more sophisticated user or system administrator. This user interface 750 illustrates a more flexible interface than the interface 710 shown in FIG. 7A. Referring to FIG. 7B, the interface 750 allows the user to select less than all devices and locations as well as users other than himself. For example, the preferred home page (for example, "www.gateway.com") is inserted into the home page preference data field 775. The user of the interface 750 may then select to which users this home page preference should be applied by inserting their respective user IDs in the users field 755. Further, rather than having only an all-or-nothing choice, the user of the interface 750 may selectively choose to which devices the home page preference should apply by entering their respective device IDs in the devices field 760, as well as choose to which locations the home page preference should apply by entering their respective location IDs in the locations field 765. These input boxes 755, 760 and 765 may include a pull down menu that allows the user to select from a list of known users, devices, and locations, respectively. Thus, a user interface 750 is provided which allows the user greater flexibility to choose how his/her preferences should be applied. It should be noted that wildcards may also be used rather than specifically naming users, devices, locations, and the like.

Other embodiments of the present invention are also possible. For example, all of the previously mentioned embodiments were directed to a three or four-dimensional (key) shared key registry. The embodiments described were characterized by their keys (e.g., user ID, device ID, application ID and location ID). However, the present invention provides for a multiple key registry (in fact, an n-dimensional registry) incorporating more and/or different dimensions (keys). For example, seasons (e.g., fall, winter, spring, and summer) may be another dimension. Other possible dimensions include days of the week, time of the day, and the like. For example, configuration and data preferences may depend on the day of the week or time of day. Furthermore, device ID keys may also be expanded. For example, devices may be distinguished by various characteristics, for example, models, types (e.g., PC versus PDA), brands, and the like. Moreover, the user may designate that a particular preference be applied not only to one particular device, user, application, and/or location, but also to more than one and/or all devices, users, applications, and/or locations. The registry structure is flexible so that a user may be even more specific (i.e., higher dimensional) when specifying when a preference and its related data are applicable. Those skilled in the art will recognize that any number of key combinations is possible using the n-dimensional approach of the present invention.

The present invention's flexible registry system may also be capable of providing automatic dissemination of many types of information for very specific situations. For example, Internet appliances located in the kitchen of the residence 301 (as shown in FIG. 3) may be such items as toasters, coffee makers, etc. A user, for example, may want these devices to have access to certain types of data primarily designed for other applications such as a personal calendar application. The data for a personal calendar application may be highly relevant to the Internet appliances in the kitchen. For example, a toaster and a coffee maker may be set so that they are turned on and off depending on the user's schedule according to his/her calendar application data.

The present invention may also include an authority structure and levels, which would prevent certain users from accessing certain data from certain devices and/or locations. For example, the user and spouse may limit what their children may access through their PC 325, Computer 2, in the children's bedroom. Similar to a system manager authority, the user and the spouse may set up the registry in the master computer such that their children are unable to access adult home pages which the user and spouse may access in their bedroom. Thus, the present invention provides for a registry system that provides individualized configuration settings for specific situations as defined by unlimited key parameters such as user ID, application ID, device ID, location ID, and the like.

Although various embodiments of the present invention have been shown and described, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims.

What is claimed is:

1. A computer system for storing and retrieving data including default preference data records, comprising:
   a memory configured to store an identifier including three or more variables for identifying each of said default preference data records stored in said computer system, wherein a first one of said three or more variables is a physical location variable relating to a physical location of at least one device other than said computer system, a second one of said three or more variables is a user identification variable, and a further one of said three or more variables being suitable for use with a wildcard in setting said default preferences; and
   communication means for communicating said default preference data records to said at least one device;
   wherein a first one of said default preference data records is associated with a first set of configuration preferences for said at least one device and a second one of said default preference data records is associated with a second set of configuration preferences for said at least one device.

2. The system of claim 1, wherein one of said three or more variables is a device identification variable.

3. The system of claim 2, further includes a timestamp for prioritizing said data.

4. The system of claim 3, wherein said system includes a registry for storing said per query data.

5. The system of claim 4, wherein said registry is provided in a database structure.

6. The system of claim 1, wherein said three or more variables includes a device identification variable and an application identification variable.

7. The system of claim 6, further including a timestamp for prioritizing data.

8. The system of claim 1, wherein said system includes a registry and said registry includes a database structure for storing said data.

9. A computer registry for storing and retrieving preference data, comprising:
   an identifier including at least three variables for identifying data stored in said computer registry, wherein a first one of said at least three variables is a physical location variable relating to a physical location of at least one device other than a computer in which said registry is stored and a second one of said at least three variables is a user identification variable, and wherein the data stored in said computer registry includes preference data; and
   a plurality of data records comprising a first data record including said identifier and associated default parameters for said at least one device;
   wherein said first data record is associated with a first set of configuration preferences for said at least one device and a second data record is associated with a second set of configuration preferences for said at least one device.

10. The registry of claim 9, further comprising a means for providing a floating value to said at least three variables.

11. The registry of claim 10, further comprising a means for associating a time stamp to said data.

12. A method for storing and retrieving data in a computer system including a computer registry, comprising the steps of:
   identifying each of a stored plurality of default preference data records in said computer system by an identifier including three or more variables, wherein a first one of said three or more variables is a physical location variable relating to a physical location of at least one device other than said computer system and a second one of said three or more variables is a user identification variable; and filling one of said variables with a wildcard for enabling default settings to be set for (i) users not listed in the computer registry and (ii) for users listed in the registry but having no preferences;

wherein a first one of said plurality of default preference data records is associated with a first set of configuration preferences for said at least one device and a second one of said plurality of default preference data records is associated with a second set of configuration preferences for said at least one device.

13. A method according to claim 12, further comprising the step of storing data in a registry.

14. A method according to claim 13, wherein one of said three or more variables is a device identification variable.

15. A method according to claim 14, further including the step of time stamping said data for prioritizing said data.

16. A method according to claim 12, further including the step of deleting one or more data items that has been superseded by a subsequent data having same identifier but a higher time stamp value.

17. A method according to claim 16, wherein said registry is provided in a database structure.

18. The system of claim 1, further comprising:
a locating a device.

19. The registry of claim 10, further comprising means for deleting one or more data items that has been superseded by a subsequent data having a same identifier but a higher time stamp value.

20. The registry of claim 9, wherein said preference data is communicated to the at least one device from the computer in which said registry is stored.

21. A method according to claim 12, further comprising:
communicating said preference data to the at least one device from said computer system.

22. The system of claim 1, wherein at least one of said three or more variables of the first one of said default preference data records differs from a corresponding one of said three or more variables of the second one of said default preference data records resulting in the first set of configuration preferences being different than the second set of configuration preferences.

23. The system of claim 1, wherein the configuration preferences include one or more from a group consisting of a default homepage, access to data, restriction from accessing data, look and feel of an application, look and feel of a user interface, setting a key function, desktop organization, automatically disseminating information, scheduled device functions, and user interface settings for said at least one device.

24. The registry of claim 9, wherein at least one of said at least three variables of the first data record differs from a corresponding one of said at least three variables of the second data record resulting in the first set of configuration preferences being different than the second set of configuration preferences.

25. The registry of claim 9, wherein the first and second sets of configuration preferences include one or more from a group consisting of a default homepage, access to data, restriction from accessing data, look and feel of an application, look and feel of a user interface, setting a key function, desktop organization, automatically disseminating information, scheduled device functions, and user interface settings for said at least one device.

26. A method according to claim 12, wherein at least one of said three or more variables of the first one of said plurality of default preference data records differs from a corresponding one of said three or more variables of the second one of said plurality of default preference data records resulting in the first set of configuration preferences being different than the second Set of configuration preferences.

27. A method according to claim 12, wherein the first and second sets of configuration preferences include one or more from a group consisting of a default homepage, access to data, restriction from accessing data, look and feel of an application, look and feel of a user interface, setting a key function, desktop organization, automatically disseminating information, scheduled device functions, and user interface settings for said at least one device.

* * * * *